United States Patent
Vernon

(10) Patent No.: US 7,236,200 B2
(45) Date of Patent: Jun. 26, 2007

(54) SLIP RING LASER ILLUMINATOR FOR SPEED DOMES

(75) Inventor: Mark William Vernon, North Shields (GB)

(73) Assignee: Extreme CCTV International Inc., St. Michael (BB)

( * ) Notice: Subject to any disclaimer, the term of this patent is extended or adjusted under 35 U.S.C. 154(b) by 734 days.

(21) Appl. No.: 10/629,698

(22) Filed: Jul. 30, 2003

(65) Prior Publication Data

US 2005/0024523 A1    Feb. 3, 2005

(51) Int. Cl.
*H04N 5/225* (2006.01)
(52) U.S. Cl. ..................... 348/370; 348/373
(58) Field of Classification Search ............. 348/65, 348/68–70, 143, 151, 152, 370, 371, 373–376; 361/707, 709; 396/267, 427
See application file for complete search history.

(56) References Cited

U.S. PATENT DOCUMENTS

| | | | | |
|---|---|---|---|---|
| 4,398,791 A | * | 8/1983 | Dorsey | 385/26 |
| 4,492,427 A | * | 1/1985 | Lewis et al. | 385/26 |
| 4,855,838 A | * | 8/1989 | Jones et al. | 348/84 |
| 5,140,265 A | * | 8/1992 | Sakiyama et al. | 324/220 |
| 5,195,392 A | * | 3/1993 | Moore et al. | 73/866.5 |
| 5,739,847 A | * | 4/1998 | Tranchita et al. | 348/143 |
| 5,879,075 A | * | 3/1999 | Conner et al. | 362/551 |
| 5,973,730 A | * | 10/1999 | Tranchita et al. | 348/143 |
| 6,091,453 A | * | 7/2000 | Coan et al. | 348/373 |
| 6,375,370 B1 | * | 4/2002 | Wesselink et al. | 396/427 |
| 6,577,339 B1 | * | 6/2003 | Thompson et al. | 348/211.14 |
| 6,698,597 B2 | * | 3/2004 | Marihugh | 211/26 |
| 2003/0095800 A1 | * | 5/2003 | Finizio et al. | 396/427 |

\* cited by examiner

*Primary Examiner*—Tuan Ho
*Assistant Examiner*—Timothy J. Henn

(57) ABSTRACT

An illumination system is provided to enable speed dome camera systems with a minimum of weight increase and existing motor designs to be used in conditions where the ambient illumination is insufficient for surveillance needs. A laser illumination system is divided and dispersed in the system, with its heavy components, namely the power supply, heat sinks, and laser beam generator mounted outside the speed dome and only a lightweight fiber optic cable output mounted adjacent to the speed dome camera. The key innovation in the present invention is having only a laser beam delivered over an optical slip joint rather than power for a laser, allowing for a higher speed of orientation of the camera. A pulsing system is used to avoid flashback within the speed dome.

11 Claims, 3 Drawing Sheets

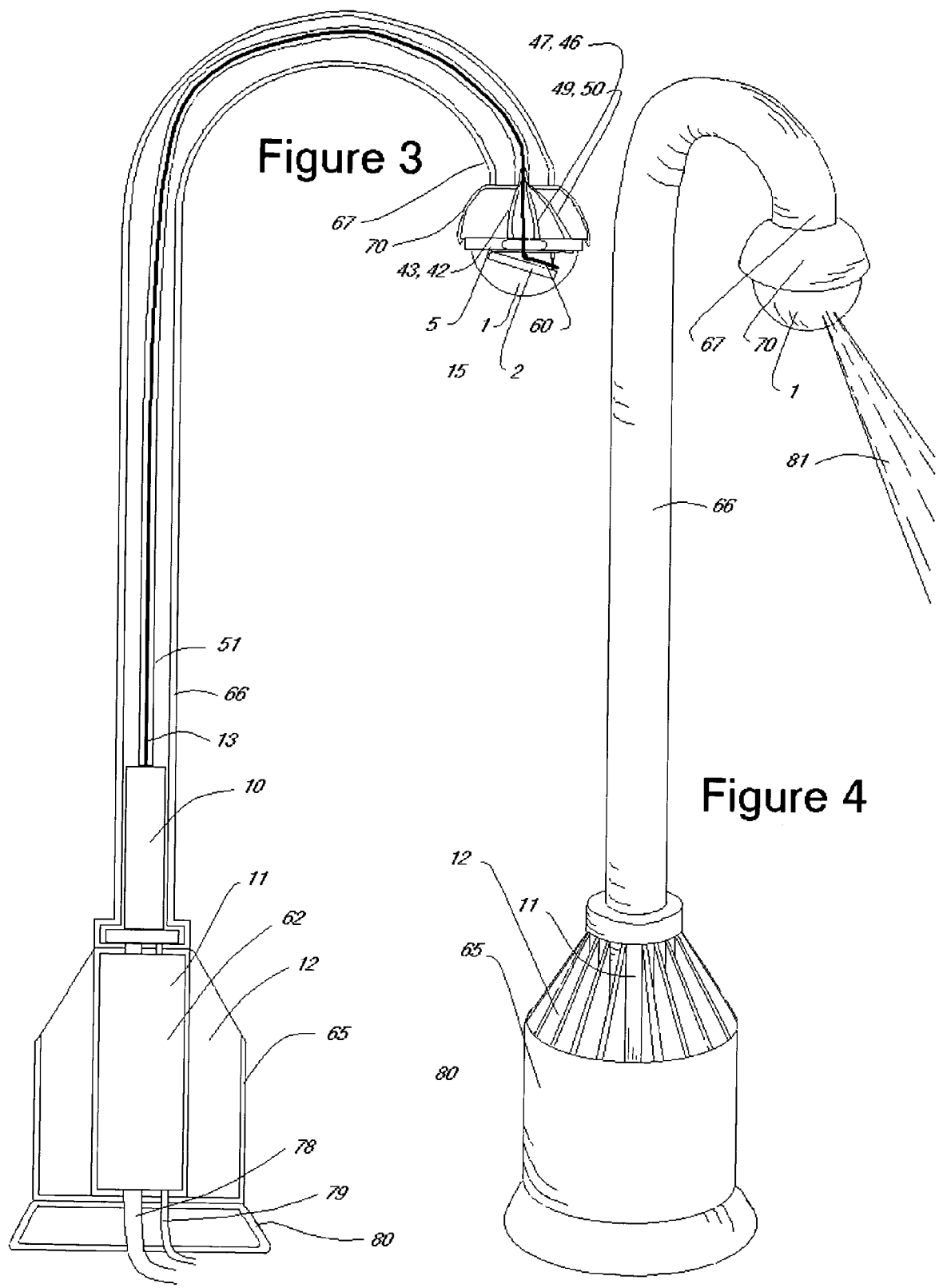

SLIP RING LASER ILLUMINATOR FOR SPEED DOMES

FIELD OF THE INVENTION

This invention relates to surveillance cameras placed inside protective domes and having advanced pan, tilt, zoom, rotation and illumination features.

DESCRIPTION OF THE PRIOR TECHNOLOGY

A significant and increasing percentage of the CCTV market is taken up by speed dome cameras.

Ordinary dome cameras, which are CCTV cameras underneath a dome-shaped housing, typically provide no pan, tilt, zoom or rotation functions. Those features are usually provided in conventional surveillance systems, where a flat top motor is provided upon which is mounted a large bracket, upon which is mounted a camera housing and illuminators each side. Speed dome cameras on the other hand are characterized by speedy pan, tilt, zoom and rotational orienting of the camera within a dome-shaped protective shield.

A typical set of specifications for a speed dome cameras would include for include a ¼-inch color CCD, a 48 dB S/N ratio, 64 preset positions and 480 TV lines. Enhancements are available such as 128 preset positions and a 50 dB S/N ratio, 22× optical zoom module, zero color rolling and vertical or horizontal image reversal.

High-end speed dome models offer functions such as day and night camera mode and weatherproof housings. Examples at the high end provide a light sensor to detect when the ambient light is less than approximately 5 lux and switch from a normal color mode to B/W mode in order to maintain resolution quality. Auxiliary illumination can be infrared for night or covert surveillance. Powerful external illuminators outside the speed dome can be used, but typically give wide and wasteful coverage, flooding a scene regardless of where the speed dome camera is pointed at any given time. If LED illuminators were used within the speed dome, the extra weight would make the speed capability of the speed dome camera plummet. LED illuminators typically require heat sinks and even fans to maintain the illuminator temperatures within acceptable levels.

Some "ordinary" dome cameras feature rotatability, typically a leisurely 10 to 12 degrees per second. But the rotating speed of a "speed dome" camera can often be adjusted from a much more rapid 0.3 to 240 degrees/second and often includes a 360 degree/second panning speed and a 90 degree/second tilting speed. Such cameras also feature zoom lenses and continuous autofocus to capture fine details and the precise locations of target areas. The speed dome camera can offer very fast angular speeds of orientation due to their small lightweight construction.

The overriding disadvantage of these products to date is that they have either a lack of illumination or uneconomic illumination. It is not economical to illuminate every area that mounted speed dome cameras can see as they have 360 degrees rotation in one plane and in the region of 180 degrees in the other.

It is also difficult to mount significant conventional illumination on the same platform as the moving camera. This is due to the disproportionate size and weight of the illumination systems to the lightweight cameras. The resulting unit would require larger domes with bigger motors and would reduce the angular speed.

A further hurdle to be overcome in providing illumination within dome cameras is internal reflection, that is, light from the illuminator reflecting off the inside of the dome and entering the camera lens. This has an obscuring effect on the informative images from the light that is reflected back through the dome from the scene being surveilled. A light baffle between the illuminator and the camera is not desirable in part because it would be increased payload for the speed dome, but mainly because to be effective the baffle would have to abut the inside surface of the dome and would therefore need to be dragged all over the inside of the dome with the likelihood of scratching or snagging. An alternate solution is needed, and is provided by this invention.

The two main surveillance system alternatives have distinct advantages and disadvantages. Conventional pan and tilt systems can point the required illumination where it is looking but are slow and aesthetically large bulky and ugly. Speed domes are very fast and aesthetic but previously could not point the light where their cameras were looking unless large illuminator systems flooded the entire potential target area, in which case the pleasing aesthetic look of the speed dome is negated with large bulky illuminators.

SUMMARY OF THE INVENTION

An illumination system is provided to enable speed dome camera systems, with a minimum of weight increase and existing motor designs, to be used in conditions where the ambient illumination is insufficient for surveillance needs.

A laser illumination system is divided and dispersed in the system, with its heavy components, namely the power supply, heat sinks, and laser beam generator mounted outside the speed dome and only a lightweight fibre optic cable output mounted adjacent to the speed dome camera.

The key innovation in the present invention is the extraordinary weight saving of having only a laser beam delivered over an optical slip joint, rather than power for a laser. The weight and space used by a powerful laser's massive heat-sink and power supply are thereby removed from the dome, allowing for a higher speed of orientation of the camera. For example, a large 20 Watt laser (equivalent to 1000 LEDs) is far too heavy to use inside current speed domes. The laser equipment is bulky in itself and moreover requires massive heat-sinking in order to maintain the equipment within the correct range of operating temperature. However all of the powerful laser's illumination can be delivered out of the end of a 1 millimeter diameter, 4 meter long, flexible, fibre optic tube that is cool to the touch. The emitted light can then be passed through a dispersing lens mounted on the same carriage as the camera in a speed dome. A curved pipe or bent lamp-post style pole can contain the flexible fibre optic tube and confine its curvature between the remote laser and the laser beam outlet adjacent to and aligned with a surveillance camera.

If the speed dome rotates back and forth within a limited rotational arc, even as high as 360 degrees of rotation, the laser illumination can be delivered via the fibre optic cable, with the rotation being permitted by sufficient slack in the fibre optic cable.

If continuous rotation of the speed dome is desired, the laser illumination is still deliverable via the weight-reduced fibre optic system by means of a optical slip joint. The separation of the laser power source from the rotatable carriage for the speed dome camera can continue even under continuous rotation with such as slip joint. The optical slip ring is a joint whereby the laser illumination is passed from a stationary pipeline to a moveable lightweight fibre optic outlet, allowing the speed dome's internal mechanisms to continually rotate on a carriage within the dome. Optical slip rings are also known as fibre optic rotary joints. They provide continuous transmission of light while rotating along a fiber axis and are used where a twist-free fiber cable is desirable or essential.

Current optical slip ring technology provides such joints that are just 20 mm in length and 6.8 mm in diameter, with insertion losses as low of less than 2 dB and a return loss of greater than 50 dB. Such joints are optimized by pressure compensation up to 10,000 psi and can have a maximum speed of up to 100 rpm, which meets or exceeds the operational requirements of speed domes. Although continuous transmission is feasible, it is also possible to time the pulse of a laser through the optical slip ring for a period in which the slip ring is stopped at any one of a number of pre-sets stops corresponding to the number of fibre optic branches in the circular array, with the output and input fibres aligned.

The optical slip ring aligns an open end of a fibre optic cable with a rotatably opposing open end of fibre optic cable within a sealed joint housing. The light travels across a small air space from the open end of the fibre optic cable attached to the light source to the opposing rotatable open end of the light outlet fibre optic cable from which it is dispersed to illuminate the desired area.

The optical slip ring can optionally be surrounded by concentric multiple channel electrical slip rings to provide low level power for the video signal and for the camera itself. The electrical slip ring can also be called an electrical rotary connector, electric swivel or electrical rotary joint. It is an electromechanical device that facilitates the transmission of power and electrical signals from a stationary object to a rotating one. An electrical rotary connector can be used in any electromechanical system that requires unrestrained, intermittent or continuous rotation while transmitting power and/or data. Electrical slip rings typically have a series of bushes in contact with corresponding rotating rings. The video signal can be converted from light to electrical information within the camera and then passed over a channel of the electrical slip joint with less weight advantage than with the laser beam optical slip joint, compared to passing the light gathered by a lens over an optical slip joint of fibre optics. It is possible however to separate even the light gathering into a second channel of the fibre optic slip joint, for maximum weight savings within the rotating parts of the speed dome. Without such slip rings, a fibre optic or an electrical cord mounted within an axle of rotation could be twisted rotationally up to a point, but if the rotation continues rather than being reversed, the cord would eventually tighten, knot up, break, or stall the system.

A "standard" kind of electrical slip ring could have an operating current of 7.5 amps per ring and an operating voltage of 1,000 VRMS, with rings of silver.

The optical slip ring can be integrated with the electrical slip ring to form an electro-optical slip ring, allowing the transmission of both electrical signals and/or power through a rotating interface as well as optical signals. Multiple electrical rings can provide a selection of power and data transmission across the electro-optical slip ring.

The dispersing lens for the outlet illumination is used as the laser light would otherwise exit the fibre over approximately 10 degrees. This lens can be motorized to change the angle of illumination.

In order to solve the problem of internal reflection within the dome, that is, light from the illuminator reflecting off the inside of the dome and entering the camera lens, the laser output is pulsed and the camera is synchronized such that it does not collect light just after each pulse, where it is reflected off the inside of the dome, but instead has a delay built in such that only light that has passed through the dome and is returning from the scene of the surveillance is collected by the camera. This is feasible despite the speed of light and the relatively small distances of typical surveillance because modern timing apparatus is capable of nanosecond adjustments.

One preferred kind of embodiment of this invention is an fibre optic laser illuminator for surveillance camera speed domes in which:

1. a laser beam is carried via a fibre optic cable to provide illumination from within a surveillance camera speed dome;
2. the laser's heavy components, comprising a power supply and a heatsink, are mounted outside the surveillance camera speed dome, in a base for support for the surveillance camera speed dome, the support being a bent pole from which the surveillance camera speed dome is suspended;
3. the fibre optic cable outlet is mounted adjacent to and in alignment with the surveillance camera such that the laser beam is emitted from the fibre optic cable outlet in the direction in which the surveillance camera is pointing, with an illuminator dispersing lens positioned adjacent to the fibre optic cable outlet such that the laser beam emitted from the fibre optic cable outlet is dispersed in the general direction in which the camera is pointed, the illuminator dispersing lens being mounted on a motorized subcarriage by which the position of the illuminator dispersing lens can be changed with respect to the fibre optic cable outlet to change an angle of dispersion of illumination;
4. the fibre optic cable outlet, the illuminator lens and the camera are mounted on a carriage that is rotatable within the speed dome, the camera being mounted on the carriage by means of a motorized pivot mechanism that allows the camera to pivot perpendicular to a plane of rotatability of the carriage within the speed dome;
5. the laser beam is carried via a fibre optic cable through an optical slip joint to provide illumination from a fibre optic cable outlet within the surveillance camera speed dome, one side of the optical slip joint being rotatable through multiple rotations together with a surveillance camera mounted within the surveillance camera speed dome, the optical slip ring aligning an open end of a fibre optic cable with a rotatably opposing open end of fibre optic cable within a sealed joint housing such that the centre of the fibre optic cable is aligned with an axis of rotation of the opposing open end with respect to the open end, and such that a laser beam can travel across a small air space from the open end of the fibre optic cable attached to a laser to an opposing rotatable open end of a further fibre optic cable to a fibre optic cable outlet from which the laser beam is dispersed to illuminate a desired area;
7. the optical slip ring is surrounded by multiple channel electrical slip rings and brushes to provide low level power for a video signal and power for the surveillance camera from a stationary support to a rotating carriage on which the surveillance camera is mounted within the speed dome;
8. the laser beam is pulsed and the surveillance camera is synchronized such that it does not collect light until just after the time required for each pulse of the laser beam to be emitted from the fibre optic cable outlet and to bounce back to the camera from an inside surface of the speed dome, but does collect light thereafter until the time required for the laser beam to be reflected from a target area back to the surveillance camera, each laser pulse having a duration that is less than the time it takes light to travel from an outer surface of the speed dome to a target area and back to the surveillance camera, in order that returning light during a camera light-collection phase will not overlap within the speed dome with light reflected from the inside surface of the speed dome from an end portion of the laser pulse emitted from the fibre optic cable outlet;

9. the laser draws at least 20 watts of power, and the fibre optic cable is approximately 1 millimeter in diameter.

DESCRIPTION OF THE DRAWINGS

FIG. 3 is a side cutaway view of the device of FIG. 1 connected to a lamp post containing a laser power supply, with the rotatable camera tilted downward approximately 30 degrees.

FIG. 4 is a perspective view of the device of FIG. 3, showing the powerful illumination emitted in alignment with the speed dome camera.

DETAILED DESCRIPTION

Figure 1:
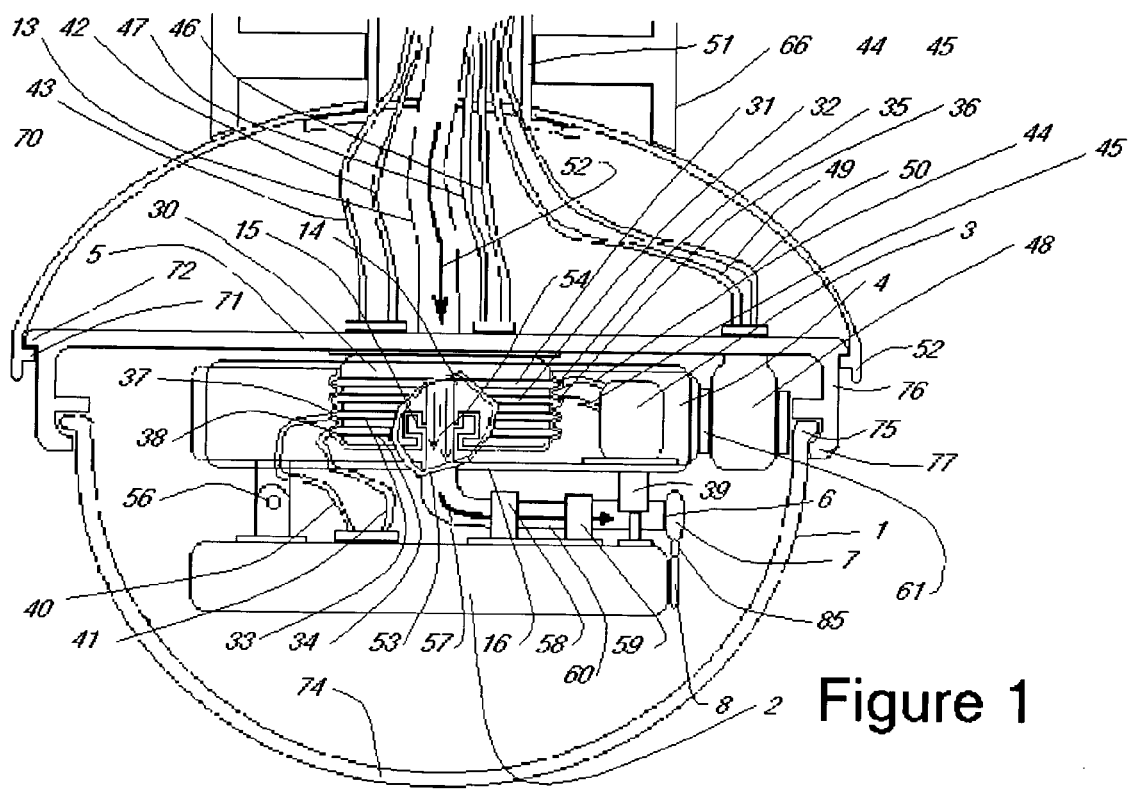
FIG. 1 is a side cutaway view of the slip ring laser illuminator for speed domes having a rotatable camera.
Figure 2:
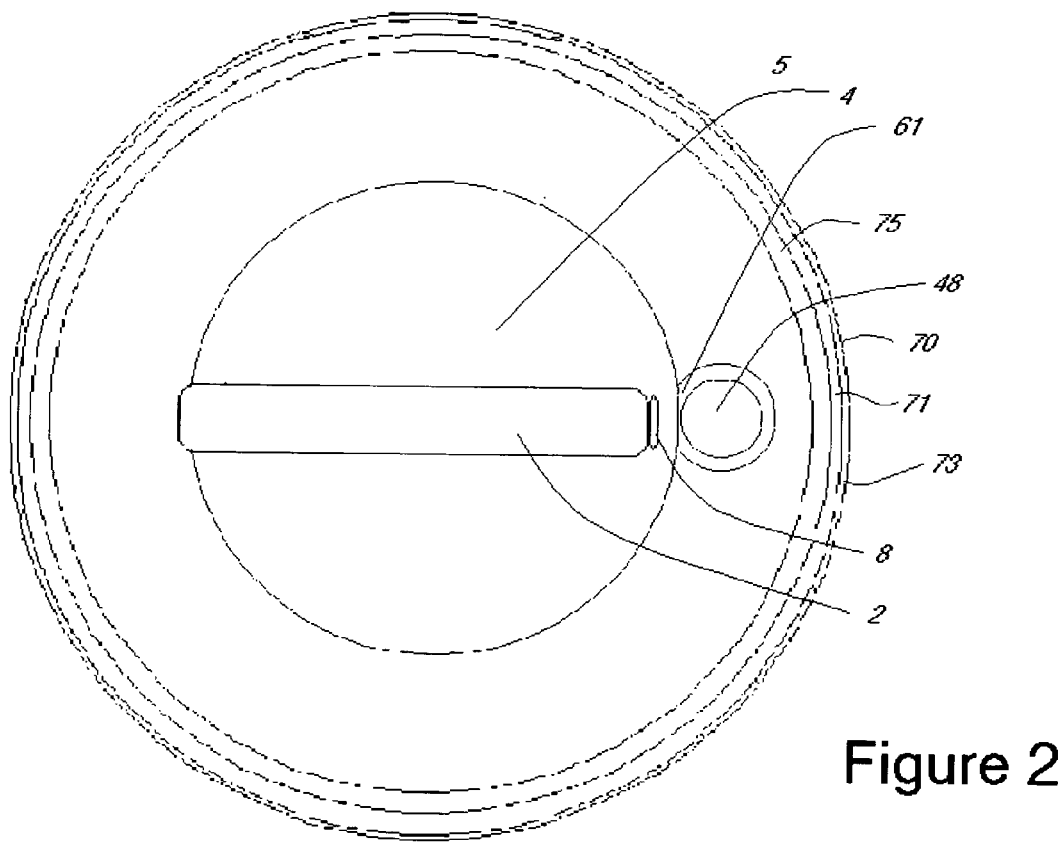
FIG. 2 is a bottom view of the device of FIG. 1, with its undercovering dome removed.

Referring to FIGS. 1, 2 and 3, the speed dome 1 has a zoom camera 2 mounted to a pan and tilt mechanism comprising motor 3, extender 39 and pivot hinge 56, all in turn mounted on a carriage 4 that is rapidly rotatable with respect to a dome base 5 and therefore rotatable with respect to a surface on which the speed dome base 5 may be mounted. The fibre optic tube outlet 6 is mounted to the camera 2 such that laser light emitted from the fibre optic tube outlet 6 is aligned with the direction in which the zoom camera 2 is pointed. A remote laser 10 with power source 11 and heat-sink 12 is mounted outside the speed dome 1. A main fibre optic tube 13 connects the laser output to the input side 14 of the optical slip ring 15. The output side 16 of the optical slip ring 15 receives the laser output and passes it to the fibre optic tube outlet 6. The input side 14 of the optical slip ring 15 is rotatable with respect to the output side 16 of the optical slip ring 15, though passing the laser output to provide a laser beam to a dispersing lens for illumination of a target area.

Referring to FIG. 1, an electrical slip ring 30 surrounding the optical slip ring channel has rotatable electrical inner contact rings as at 31, 32, 34 and 34 that abut against two pair of positive and negative outer contact rings 35, 36, 37, and 38 to provide power and video out signal across the rotating mechanism in the speed dome 1. Thus the camera video signal wires 40 and 41 can transmit their signals via contacts at 37, 33 and 38, 34 respectively to the output video signal wires 42 and 43. Likewise the tilt motor control wires 44 and 45 are connected via contacts at 35, 31 and 36, 32 to the input tilt control wires 46 and 47. The rotator motor 48 rotates the carriage 4 and thereby the carriage-mounted camera 2 and laser beam outlet 6 via the engagement mechanism 61 (which could be belt or gears). The rotator motor 48 is electrically operated via power supply and control wires 49 and 50. The fibre optic cable 13 and the wires 42, 43, 46, 47, 49 and 50 are all contained within the conduit 51 with the main lamp post tube 66. Thus the camera can be supplied power, including its optional enhancements such as remote-controlled pan and tilt or zoom lens motors regardless of multiple rotations of the speed dome mechanism. The output from the camera itself can likewise be sent over an electrical slip ring to prevent twisting of the output cable in the event that the camera is sent through a number of rotations rather than back and forth through partial but reversing rotations.

Still referring to FIG. 1, the laser beam is carried within the fibre optic cable 13 in the direction of the inlet arrow 52. The cut-out view break at 53 shows the interior of the optical slip ring 15, in which the laser light at arrows 54 crosses the juncture from the fixed, top portion of the optical slip ring 15 to the bottom, rotatable portion that is conjoined with the rotating carriage 4. The laser beam continues toward the outlet 6 in the direction of the outlet arrow 57. Mounting brackets 58 and 59 hold the fibre optic cable outlet portion 60 in alignment with the camera 2, adjacent to the outlet 6. The translucent dome 74 has a snap-in rim 75 that fits within the interlocking rim 77 of the base wall 76.

Referring to FIGS. 1 and 2, the speed dome base 5 is held in place by the protective top cap 70, which has an overlapping rim 71 that interlocks with a base rim 72 on the base 5. A drip edge rim 73 allows rain that lands on the top cap 70 to fall cleanly to the ground without flowing over the translucent dome 74 of the speed dome 1.

Referring to FIG. 3, the laser power supply 11 is massive, comprising enormous heat sinks 12 and large capacitors 62 for storage and instant discharge of large amounts of electrical current. It is not only an advantage to have the laser power supply outside the speed dome itself, it is also an advantage to have this weight placed for stability in the bottom portion 65 of the lamp post 66. The laser 10 itself can also be placed in the lamp post 66 in order to keep weight out of the speed dome 1 affixed to the end 67 of the lamp post 66. The laser beam generated by the laser 10 travels up the fibre optic tube 13, which is located within a conduit 51 within the lamp post 66, and thereby to the fibre optic tube and optical slip joint 15 of the speed dome 1. The laser power supply cable 78 and the video control and output cable 79 enter the lamp post base 80 from below.

Figure 5:
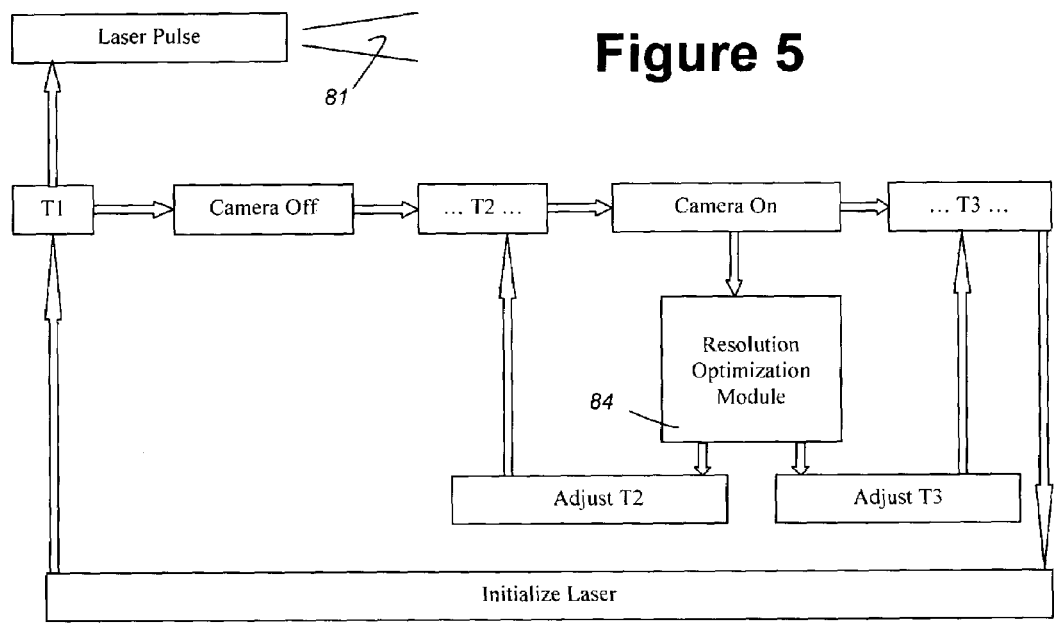
FIG. 5 is a block diagram of a pulse delay system to ameliorate internal reflection within the device of FIG. 1.
Figure 6:
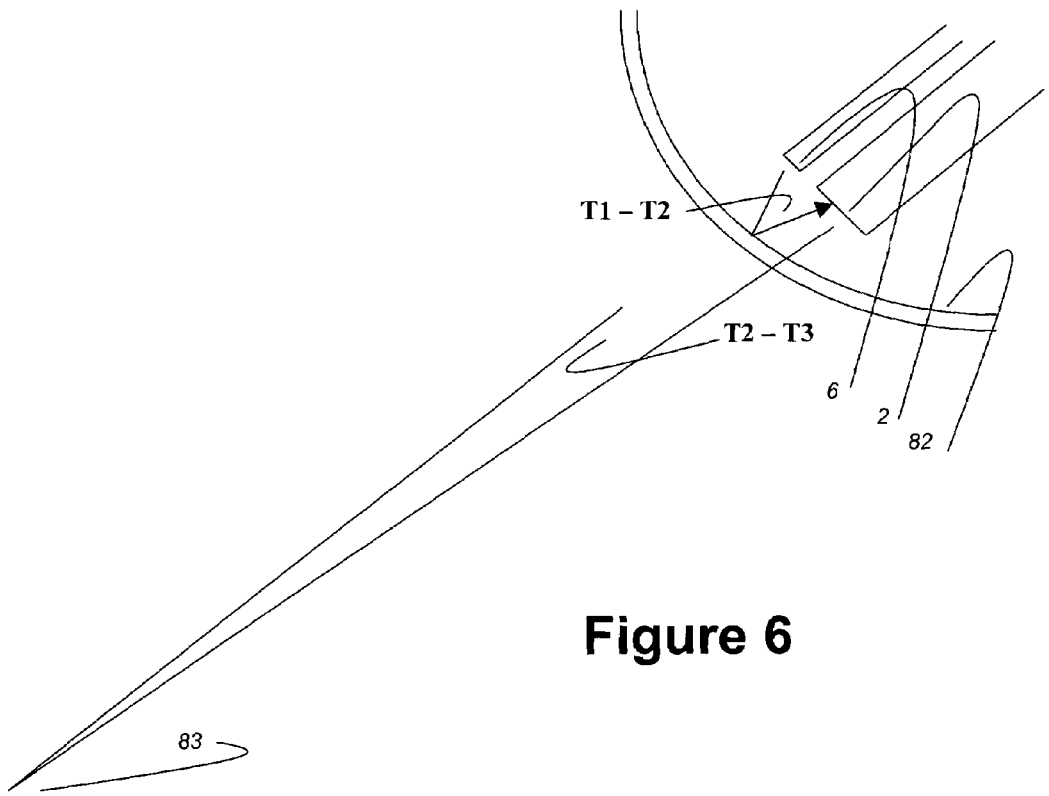
FIG. 6 is a side view schematic of the timing the pulse delay system of FIG. 5.

Referring to FIGS. 5 and 6, a pulse 81 of laser light is emitted from the fibre optic outlet 6 at time T1. The zoom camera 2 is turned off during the time T1 to T2 it takes the entire pulse 81 to travel from the outlet 6 to the dome wall 82 and back to the camera 2. The camera is then turned on for the longer period of time from T2 to T3 that it takes the pulse 81 to travel to the surveilled scene 83 and return to the camera 2. The sequence is then repeated in a loop. A resolution optimization feedback loop 84 is used to compare the effect of varying T2 to account for echo reflection, and of varying T3 incrementally as the distance to the scene 51 would typically be a range in real-life situations.

Referring again to FIG. 1, a dispersing lens 7 is affixed adjacent to the fibre optic tube outlet 6 such that laser light emitted from the fibre optic tube outlet is dispersed over an angle that approximates the light-gathering angle of the lens 8 of the camera 2. The illuminator dispersing lens 7 can be mounted on a motorized subcarriage 85 by which the position of the lens can be adjusted to effect the angle at which the laser light is dispersed to a scene to be surveilled.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A fibre optic illuminator for surveillance speed domes in which:
   a) a beam from a light source is carried via a fibre optic cable to provide illumination from within a surveillance speed dome;
   b) the light source's heavy components, comprising a power supply and a heatsink, are mounted outside the surveillance speed dome;
   c) the light source's power supply and heatsink are mounted in a base for a support for the surveillance speed dome.

2. The fibre optic illuminator for surveillance speed domes of claim 1, in which the support is a bent pole from which the surveillance speed dome is suspended.

3. The fibre optic illuminator for surveillance speed domes of claim 2, in which the fibre optic cable outlet is mounted adjacent to and in alignment with a surveillance camera and an illuminator dispensing lens is positioned adjacent to the fibre optic cable outlet such that the beam from the light source emitted from the fibre optic cable outlet is dispersed in the general direction in which the camera is pointed.

4. The fibre optic illuminator for surveillance speed domes of claim 3, in which the beam is pulsed and the surveillance camera is synchronized such that it does not collect light until just after the time required for each pulse of the beam to be emitted from the fibre optic cable outlet and to bounce back to the camera from an inside surface of the speed dome, but does collect light thereafter until the time required for the beam to be reflected from a target area back to the surveillance camera, and each pulse has a duration that is less than the time it takes light to travel from an outer surface of the speed dome to a target area and back to the surveillance camera, in order that returning light during a camera light-collection phase will not overlap within the speed dome with light reflected from the inside surface of the speed dome front an end portion of the beam emitted from the fibre optic cable outlet.

5. The fibre optic illuminator for surveillance speed domes of claim 3, in which:
   a) a laser beam from the light source is carried via a fibre optic cable through an optical slip joint to provide illumination from the fibre optic cable outlet within the surveillance speed dome, one side of the optical slip joint being rotatable through multiple rotations together with the surveillance camera mounted within the surveillance speed dome;
   b) an optical slip ring aligns an open end of the fibre optic cable with a rotatably opposing open end of the fibre optic cable within a sealed joint housing such that the laser beam can travel across a small air space from the open end of the fibre optic cable attached to the light source to an opposing rotatable open end of a further fibre optic cable and thereby to a fibre optic cable outlet from which the laser beam is dispersed to illuminate a desired area;
   c) the optical slip ring aligns the open end of the fibre optic cable with the rotatably opposing open end of fibre optic cable within the sealed joint housing such that the centre of the fibre optic cable is aligned with an axis of rotation of the opposing open end with respect to the open end;
   d) the optical slip ring is surrounded by multiple channel electrical slip rings and brushes to provide low level power for a video signal and power for the surveillance camera from a stationary support to a rotating carriage on which the surveillance camera is mounted within the speed dome.

6. The fibre optic illuminator for surveillance speed domes of claim 5, in which the fibre optic cable outlet, the illuminator lens and the camera are mounted on a carriage that is rotatable within the speed dome, and the laser beam is pulsed and the surveillance camera is synchronized such that it does not collect light until just after the time required for each pulse of the laser beam to be emitted from the fibre optic cable outlet and to bounce back to the camera from an inside surface of the speed dome, but does collect light thereafter until the time required for the laser beam to be reflected from a target area back to the surveillance camera, and each of the laser beam pulse has a duration that is less than the time it takes light to travel from an outer surface of the speed dome to a target area and back to the surveillance camera, in order that returning light during a camera light, collection phase will not overlap within the speed dome with light reflected from the inside surface of the speed dome from an end portion of the light source pulse emitted from the fibre optic cable outlet.

7. A fibre optic illuminator for surveillance speed domes in which:
   a) a beam from a light source is carried via a fibre optic cable to provide illumination from within a surveillance speed dome;
   b) the light source's heavy components, comprising a power supply and a heatsink, are mounted outside the surveillance speed dome;
   c) the beam from the light source is carried via a fibre optic cubic to provide illumination from within a surveillance speed dome and an illuminator dispersing lens is mounted on a motorized subcarriage by which the position of the illuminator dispersing lens can be changed with respect to a fibre optic cable outlet to change an angle of dispersion of illumination.

8. The fibre optic illuminator for surveillance speed domes of claim 7, in which the fibre optic cable outlet and the illuminator dispersing lens are mounted on a carriage that is rotatable within the surveillance speed dome.

9. The fibre optic illuminator for surveillance speed domes of claim 8, in which a camera is mounted on the carriage by means of a motorized pivot mechanism that allows the camera to pivot perpendicular to a plane of rotatability of the carriage within the surveillance speed dome.

10. A fibre optic illuminator for surveillance speed domes in which:
    a) a beam from a light source is carried via a fibre optic cable to provide illumination from within a surveillance speed dome;
    b) the light source's heavy components, comprising a power supply and a heatsink, are mounted outside the surveillance speed dome;
    c) the beam from the light source is carried via a fibre optic cable through an optical slip joint to provide illumination from a fibre optic cable outlet within the surveillance speed dome, one side of the optical slip joint being rotatable through multiple rotations within the surveillance speed dome;

d) an optical slip ring aligns an open end of a fibre optic cable with a rotatably opposing open end of the fibre optic cable within a sealed joint housing such that the beam from the light source can travel across a small air space from the open end of the fibre optic cable attached to the light source to an opposing rotatable open end of at further fibre optic cable to the fibre optic cable outlet from which the beam from the light source is dispersed to illuminate a desired area;

e) the optical slip ring aligns the open end of the fibre optic cable with the rotatably opposing open end of fibre optic cable within the sealed joint housing such that the center of the fibre optic cable is aligned with an axis of rotation of the opposing open end with respect to the open end;

f) the optical slip ring is surrounded by multiple channel electrical slip rings and brushes to provide low level power for a video signal and power for a surveillance camera from a stationary support to a rotating carriage on which the surveillance camera is mounted within the surveillance speed dome.

11. A fibre optic illuminator for surveillance speed domes in which:

a) a beam from a light source is carried via a fibre optic cable to provide illumination from within a surveillance speed dome;

b) the light source's heavy components, comprising power supply and a heatsink, are mounted outside the surveillance speed dome;

c) the beam from the light source is pulsed and a surveillance camera is synchronized such that it does not collect light until just after the time required for each pulse of the beam from the light source to be emitted from the fibre optic cable outlet and to bounce back to the surveillance camera from an inside surface of the speed dome, but does collect light thereafter until the time required for the beam from the light source to be reflected from a target area back to the surveillance camera.

* * * * *